Oct. 19, 1943.   A. WINSICK   2,332,286
FLAG HOLDER FOR AUTOMOBILES
Filed Nov. 16, 1942
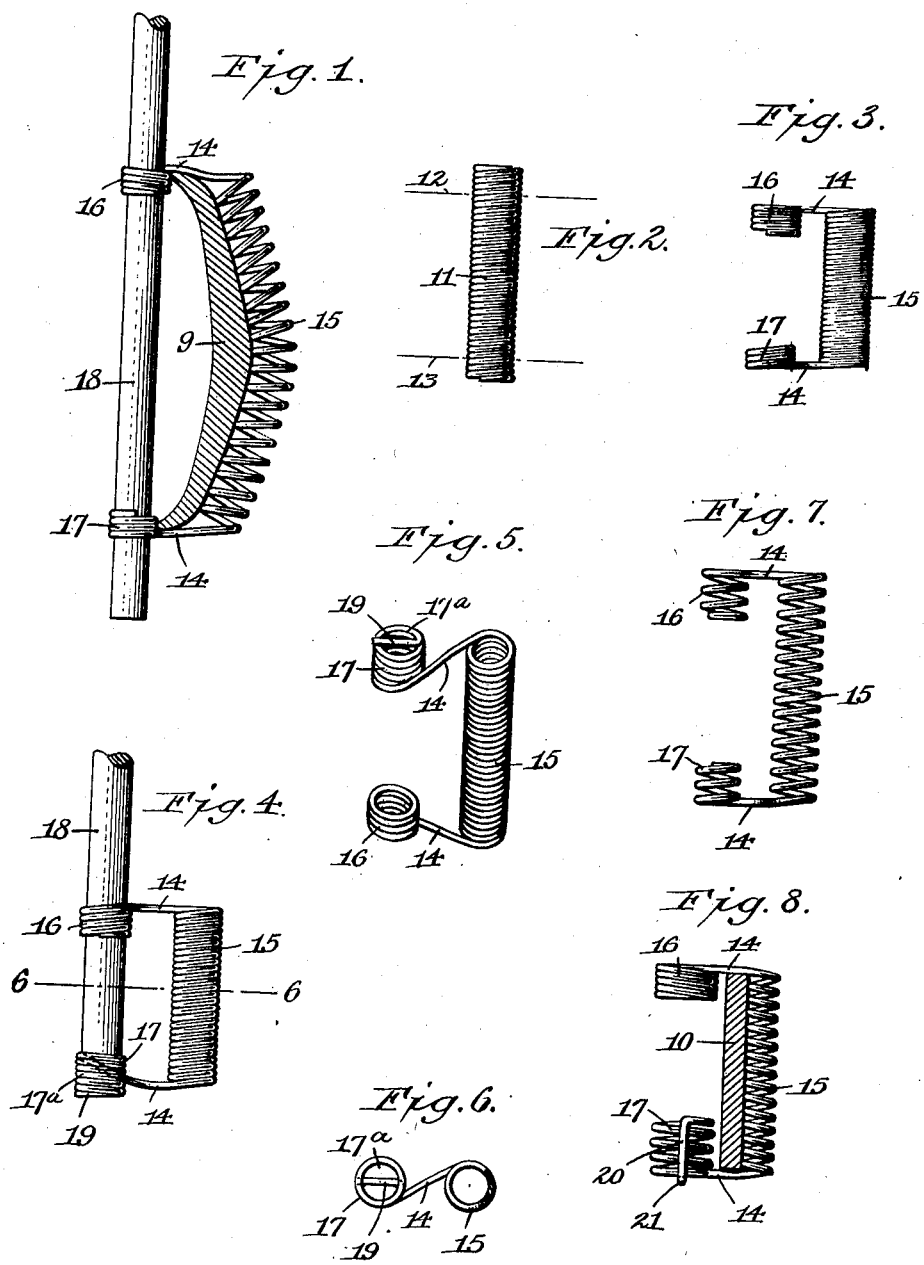
Anthony Winsick
Inventor,
By Emil Neuhard
Attorney Patented Oct. 19, 1943

2,332,286

UNITED STATES PATENT OFFICE 2,332,286

FLAG HOLDER FOR AUTOMOBILES

Anthony Winsick, Hamburg, N. Y.

Application November 16, 1942, Serial No. 465,807

7 Claims. (Cl. 248—43)

My invention relates to a flag-holder, and more particularly to that type of holder designed to be applied to an automobile for displaying a medium-sized flag, such as are commonly used during national holidays, or in times of stress when one's patriotism is to be shown.

My invention has for its object to provide a flag-holder formed of wire fashioned into spiral spring form, self-conformable to an automobile part to which it is to be attached, and self-contractible with retainer portions at opposite ends and with offset staff-holding elements at said retainer portions.

My invention has for another of its objects to provide a simple and inexpensive flag-holder which can be constructed from a spiral spring, a number of whose convolutions at opposite ends are drawn out of line to form a self-conformable, expansible, and self-contractible body portion of spiral-spring formation and alined staff-holders offset thereto and connected therewith by retainer or impinging members.

A still further object of my invention is to provide a flag-holder designed to be attached to the bumper, one of the bumper-brackets, or to any other similar automobile part, and wherein a spiral spring serves as the body-portion of the holder, at opposite ends of which staff-holding elements extend laterally therefrom; said body portion and staff holding-elements being connected together by impinging elements engaging the automobile part and said flag-holding elements and the staff of a flag placed therein serving to prevent accidental removal of the flag-holder from said automobile part.

A still further object of my invention is to provide a flag-holder which can be formed of a length of spiral spring from which any desired number of convolutions at opposite ends thereof may be drawn laterally and positioned in axial alinement to receive the staff of a flag after attachment of the holder to an automobile part; said end convolutions forming spiral-spring sections offset with respect to the remainder of the spring and being connected with the latter by portions of the wire uncoiled in the act of offsetting said end convolutions.

My invention consists in the novel feature of construction and in the arrangement and combination of parts to be hereinafter described and more particularly pointed out in the subjoined claims.

In the drawing:

Fig. 1 is a side elevation of my improved flag-holder shown applied to the bumper of an automobile; the bumper being shown in section and the staff of a flag being held to said bumper by means of the holder.

Fig. 2 is a side view of a closely-coiled spiral spring, such as may be used for forming my improved flag-holder.

Fig. 3 is a side elevation of a flag-holder constructed from a spiral spring, such as shown in Fig. 2.

Fig. 4 is a side elevation of a modified form of my improved flag-holder in which a socket is provided at the lower end of the holder, the staff of a flag being shown applied thereto for the purpose of illustrating that in this modification the staff of a flag does not extend beneath the lower end of the holder.

Fig. 5 is an inverted perspective view of the flag-holder shown in Fig. 4.

Fig. 6 is a transverse section taken on line 6—6, Fig. 4.

Fig. 7 is a side view of a still further modified form of my invention, in which the convolutions of the spiral-like body portion and staff-holding elements are shown spaced-apart.

Fig. 8 is a side view of the holder in still further modified form, the convolutions of the flag-holding elements being of greater diameter than the convolutions of the body portion and the lower staff-holding element being shown in the form of a socket, modified from that shown in Fig. 4.

Having reference to the drawing in detail, I have shown in Fig. 1 a bumper in cross section, designated by the numeral 9, to which the preferred form of my invention is shown applied and in Fig. 8 a cross section of a bracket 10, such as used for connecting the bumper to the chassis of an automobile.

While this improved flag-holder may be constructed in various sizes without utilizing or first forming a length of spiral spring in which the convolutions thereof are of the same diameter, whether closely coiled or in open formation, I have illustrated a simple means to construct my improved flag-holder by utilizing a spiral spring of any given length. It is to be understood that these flag-holders may be made in various lengths so that the purchaser may select a holder best adapted for use on the particular part of an automobile or other object to which he desires to attach a flag.

I have shown a spiral spring 11 in Fig. 2 and have drawn lines 12 and 13 through the same near opposite ends. These lines indicate a point at which end convolutions of the spring may be separated from the intermediate convolutions and this separation is effected by drawing the convolutions above the upper line 12 in Fig. 2 and the convolutions below the lower line 13 in said figure to one side of the intermediate convolutions by uncoiling portions of the convolutions at said lines 12 and 13, as shown at 14. The intermediate convolutions are necessarily those along the major portion of the spiral spring and serve as the body portion 15 of the flag-holder. These end convolutions or spiral-like sections serve as staff-holding elements 16 and 17, respectively. They are vertically alined and reversed as complete members from the position these parts originally had in the complete spiral spring shown in Fig. 2, and they are substantially parallel with the body portion 15. These spiral-like sections or staff-holding elements therefore do not extend above or below the plane of the upper and lower ends, respectively, of the body portion 15.

By reason of the body portion 15 being in the form of a spiral spring or spiral-like member, it is expansible under force, and self-retractible and flexible so that it may be easily bent or curved, yet recover its normal straight-line condition. This permits the holder to be easily attached to any automobile part; for instance, such as the bumper 9 shown in Fig. 1. It is merely necessary to stretch the body portion 15 so as to lengthen the same by separating the convolutions thereof, as shown in Fig. 1, thereby increasing the length of this body portion to conform to the width of the bumper. This enables the uncoiled portions 14 to be positioned against the upper and lower edges of the bumper so that the spiral-like sections or staff-holding members 16 and 17 are positioned in rear or at the inner side of the bumper at their longitudinal marginal portions, as clearly shown in Fig. 1.

It will thus be seen that the uncoiled portions 14 serve as impinging or retaining members or elements which are caused to press firmly against the edges of the bumper under tension created by expanding or lengthening the body portion of the holder, and due to the fact that the staff-holding elements 16 and 17 engage the bumper at the rear, accidental removal of the holder from the bumper can not easily take place. However, since the staff of a flag, designated by the numeral 18, is inserted through the vertically-alined spiral-like sections 16 and 17, this staff materially aids such sections in their efforts to fasten the holder to the bumper or to any other like part of an automobile.

It is to be noted, that the bumper shown in Fig. 1 is not straight-lined and that it bevels from its longitudinal center upwardly and downwardly. It, therefore, has an irregularly shaped outer surface. Bumpers of automobiles vary in cross-sectional formation and many have a more pronounced taper upward and downward than shown in Fig. 1. This, however, does not in any manner interfere with attaching the flag-holder to such bumpers, or any other irregularly-formed part of an automobile, because of the fact that the body portion 15 of the holder is flexible and self-conformable to the shape of the part to which the holder is to be applied.

The body portion of the holder is also self-contractible, so that the tension under which it is placed will cause the impinging members 14 to firmly engage the edges of the bumper and thus in themselves tend to fasten the holder to the automobile part. This is clearly shown in Fig. 8, in which the staff-holding elements 16 and 17 are not in direct contact with the part to which the holder is attached.

It will be apparent from foregoing that I have devised a holder which embodies an elongated expansible and self-conformable body portion, and offset staff-holding elements connected at opposite ends with said body portion by elements designed to impinge against opposite edges or sides of an automobile part while the body portion is under tension.

In the construction thus far specifically described, the staff 18 of a flag is to be passed through the upper staff-holding element 16 and also through the lower staff-holding element 17 so that the staff extends beneath both the flag-holder and the part of the automobile to which it is attached. In this construction the staff-holding elements or sleeves are each formed of one or more terminal convolutions of a spiral spring of a size that will conform internally in diameter to that of the staff of the flag to be held, and in such instances the staff is to snugly fit within the staff-holding elements or sleeves. In the preferred construction I have shown the convolutions of the wire in contact with each other, but if desired the convolutions may be spaced-apart, as shown in Fig. 7.

In the modification of my invention shown in Figs. 4 to 6, the body portion of the flag-holder and the upper sleeve or staff-holding element are exactly those described in the preferred construction illustrated in Figs. 1 and 3. The lower staff-holding element 17 is, however, in the form of a socket, to which I apply the supplemental reference character 17ª. This socket may or may not be arranged to extend slightly beneath the plane of the lower end of the body portion 15, as may be desired. It will be noted that in the preferred construction shown in Figs. 1 and 3, the uncoiled portion 14 connecting the lower staff-holding element 17 with the body portion 15 extends from the lower end of the latter to the lower end of said staff-holding element; but in the modification shown in Figs. 4, 5, and 6, the lower uncoiled portion or impinging connector member 14, as it may be termed, connects the lower end of the body portion 15 with the lower staff-holding element at its upper end. Therefore, while in the preferred construction the staff-holding element 17 extends upwardly from its connector member 14, in the modification referred to, the staff-holding element 17 extends downwardly from the connector element 14. I prefer in this modification to make the staff-holding element 17 slightly longer than in the preferred construction. This is due to the fact that connection is made between the lower end of the body portion and the upper end of said staff-holding element and that this element is used as a socket, as will presently appear.

In said modification, one end of the wire from which the holder is formed terminates at the lower end of the staff-holding element 17 and by reason of this difference in construction I am enabled to utilize the lower staff-holding element as a socket. To accomplish this, the wire at the lower end of the socket is bent diametrically across the open lower end of the staff-holding element, as at 19, so that a bottom is formed for the socket on which the lower end of the staff of a flag may rest. Therefore, only a single sleeve-like staff-holding element is employed at the upper end of the holder and a staff-receiving socket at the lower end, as clearly shown in Fig. 4. The staff of a flag is thrust through the upper staff-holding element or sleeve 16 and entered in the socket 17ᵃ at the bottom of the holder, receiving support from the diametrically-disposed wire terminal 19. It will be clear, therefore, that in this construction the staff of the flag may be somewhat smaller in diameter than the internal diameter of the sleeve 16 and the socket 17ᵃ, since it can not be thrust through the socket and will be guided by the sleeve 16 while supported by the diametrically-disposed terminal 19, or the bottom of the socket as it may be termed. By reason of the increased length of the socket, the staff of the flag cannot easily become dislodged from the holder under jarring of the automobile in passing over rough roads.

It is to be noted that in order to provide a terminal for the wire at the bottom of the socket 17ᵃ, the lower convolutions of the spiral spring will have to be reversed top for bottom and this can be easily accomplished by twisting the uncoiled wire portion 14. Thus the terminal of the wire forming the holder will be at the bottom of the socket and this can be easily straightened from a curved condition to a straight-lined condition and thence bent diametrically across the lower end of the thus segregated convolutions.

In Fig. 8, the modification there shown illustrates a body portion 15 which is of a smaller diameter than the diameter of the staff-holding elements 16 and 17. In this particular construction, due to the difference in the diameter of the parts just mentioned, the holder will of necessity be constructed of a single piece of wire in which different regions in the length thereof are fashioned separately into spiral form. I have also illustrated a form of socket for the staff of a flag which differs from the socket illustrated in Figs. 4 to 6. The socket in this Fig. 8 is formed of a spiral convolutions extending upward from the uncoiled impinging or connector element 14, the same as provided for in Figs. 1 and 3 and under this arrangement twisting of the uncoiled element connecting the socket with the lower end of the body portion will not be found necessary. The extremity of the wire which terminates at the upper end of the socket is bent downwardly outside of the series of spiral convolutions forming the socket, as at 20, and thence diametrically underneath said series of spiral convolutions, as at 21; the diametrically-extending portion 21 serving as the bottom of the socket.

It will be apparent from the foregoing that my improved flag-holder can be fashioned out of a spiral spring, or it may be constructed of a single length of wire coiled medially between its ends to form the spiral body portion and thence directed laterally to one side of the body portion and coiled to form the spiral-like sleeves at the top and bottom, or the spiral-like sleeve at the top and the spiral-like socket at the bottom, as may be desired. In either case the body portion of the holder is flexible, whether formed of contacting convolutions or convolutions spaced-apart. It is also expansible under force, self-retractible, and self-conformable to the surface of any object against which it may be placed. The offset sleeves, or the offset sleeve and socket, as the case may be, will effectively retain the staff of a flag and the uncoiled wire portions connecting the staff-holding elements with the flexible body portion will effectively impinge against the particular part of an automobile or other object to which the holder is attached under the self-contractible force inherent in the body portion; thus assuring a secure fastening of the flag-holder to such part. Moreover, such assurance is absolute after placing the staff of a flag through the sleeve-like upper staff-holding element and into or through the lower staff-holding element. The part of the automobile or other object to which the flag is attached will then be entirely surrounded by the flag-holder and the staff within the holder.

Having thus described my invention, what I claim is:

1. A flag-holder, comprising a body portion formed of wire fashioned into a single length of spiral spring and having laterally offset substantially parallel staff-holding elements at opposite ends of spiral-spring formation connected to said body portion.

2. A flag-holder formed of a single piece of wire and having a body portion fashioned into a spiral spring and laterally offset axially co-incident staff-holding elements, each staff-holding element being connected to said body portion by uncoiled wire portions designed to engage opposite edges of an automobile part when applied thereto and placed under tension, said body portion being self-conformable to the cross-sectional formation of said automobile part when placed under tension.

3. A flag-holder for automobiles formed from a spiral spring having end convolutions drawn laterally to form short spiral-spring sections offset with respect to the remainder of said spring and connected therewith by uncoiled portions of the wire forming said spring, said offset sections being axially co-incident.

4. A flag-holder for automobiles formed from a closely coiled spiral spring having end convolutions thereof drawn laterally to form short spiral-like sections offset with respect to the remainder of said spring and connected therewith by uncoiled portions of the wire forming said spring, said offset portions being axially co-incident and adapted to hold the staff of a flag.

5. A flag-holder for automobiles formed of a single length of wire having a body portion of spiral-like formation and two vertically alined spiral-like sections connected to opposite ends of said body portion by uncoiled portions of said wire, said body portion and spiral-like sections lying at opposite sides of an automobile part and having the uncoiled portions of said wire impinging against the edges of said automobile part, said spiral-like sections serving as staff-holding elements to receive the staff of a flag, the lower of said spiral-like sections having one end of the wire disposed diametrically beneath the same to serve as a rest for said staff.

6. A flag-holder for an automobile formed of a single length of wire having a body portion of spiral-like formation and two vertically alined spiral-like sections connected to opposite ends of said body portion by uncoiled portions of said wire, the upper of said sections serving as a staff-holding sleeve and the lower as a staff-receiving socket formed by one end of said wire being bent downwardly along the outer side of the lower spiral-like section and thence directed diametrically underneath the same, said body portion being adapted to lie at one side of an automobile part and being self-retractible to cause the uncoiled portions of said wire to impinge against the edge of said automobile part and said spiral-like sections being adapted to lie at the opposite side of said automobile part.

7. A flag-holder for an automobile, comprising a body portion of spiral-spring formation having lateral uncoiled extensions at opposite ends and alined staff-holding elements at the outer ends of said extensions, said body portion being adapted to lie against one side of an automobile part and said staff-holding elements at the opposite side of said automobile part in spaced-apart relation and adapted to have the staff of a flag applied therein, said laterally uncoiled extensions being adapted to lie above and beneath said automobile part and said spaced-apart staff-holding elements and the staff of a flag placed therein preventing accidental removal of the flag and holder from said automobile part.

ANTHONY WINSICK.